(12) United States Patent
Etzold et al.

(10) Patent No.: US 10,867,379 B2
(45) Date of Patent: Dec. 15, 2020

(54) METHOD AND APPARATUS FOR OPTICALLY INSPECTING A MOLD FOR MANUFACTURING OPHTHALMIC LENSES FOR POSSIBLE MOLD DEFECTS

(71) Applicant: ALCON INC., Fribourg (CH)

(72) Inventors: Fabian Etzold, Darmstadt (DE); Arno Florian Warken, Abtsteinach (DE); Daniel Kiefhaber, Heidelberg (DE); Giovanni Campanelli, Grosswallstadt (DE)

(73) Assignee: Alcon Inc., Fribourg (CH)

( * ) Notice: Subject to any disclaimer, the term of this patent is extended or adjusted under 35 U.S.C. 154(b) by 22 days.

(21) Appl. No.: 16/538,446

(22) Filed: Aug. 12, 2019

(65) Prior Publication Data

US 2020/0051233 A1 Feb. 13, 2020

Related U.S. Application Data

(60) Provisional application No. 62/718,064, filed on Aug. 13, 2018.

(51) Int. Cl.
*G06T 7/00* (2017.01)
*B29C 33/70* (2006.01)
(Continued)

(52) U.S. Cl.
CPC ............ *G06T 7/0002* (2013.01); *B29C 33/70* (2013.01); *G01N 21/8806* (2013.01);
(Continued)

(58) Field of Classification Search
CPC ......... G06T 7/0002; G06T 2207/10148; G06T 2207/10152; G06T 2207/30168;
(Continued)

(56) References Cited

U.S. PATENT DOCUMENTS 6,207,946 B1 3/2001 Jusoh et al.
8,740,382 B1 * 6/2014 Liu .................. A61B 3/113
351/210

(Continued)

FOREIGN PATENT DOCUMENTS

JP 2005-265543 9/2005

*Primary Examiner* — Nasim N Nirjhar
(74) *Attorney, Agent, or Firm* — Patrick M. Ryan

(57) ABSTRACT

A method for optically inspecting a mold (10) for manufacturing ophthalmic lenses such as contact lenses for possible mold defects, including: generating a set of images of the mold (10) for different azimuthal illumination angles ($\phi 1$, $\phi 9$) using an illumination system (20) and an imaging system (30), the latter being aligned such that its focal plane cuts through the mold (10) at a specific axial position along a center axis of the mold (10); generating a focal plane image by averaging pixelwise over the set of images after having masked out in each image those regions that include direct specular reflections from the mold (10); repeating the previous steps for one or a plurality of different axial positions of the focal plane such as to generate a plurality of different focal plane images; identifying one or more image features in the plurality of focal plane images indicative for a possible mold defect; determining for each identified image feature in which focal plane image the identified image feature appears sharpest; generating for each identified image feature a respective image section out of the respective sharpest focal plane containing the image feature; and generating a composed dark field image of the mold (10) by composing the respective image sections for each identified image feature, thus enabling to determine as to whether the possible defects of the mold (10) still allow the mold (10) to be used.

20 Claims, 7 Drawing Sheets

(51) Int. Cl.
*G01N 21/88* (2006.01)
*G01N 21/95* (2006.01)
*G06K 9/20* (2006.01)
*G06K 9/38* (2006.01)
*G06T 5/50* (2006.01)
*H04N 5/225* (2006.01)
*B29D 11/00* (2006.01)

(52) U.S. Cl.
CPC ........... *G01N 21/95* (2013.01); *G06K 9/2054* (2013.01); *G06K 9/38* (2013.01); *G06T 5/50* (2013.01); *H04N 5/2256* (2013.01); *B29C 2033/705* (2013.01); *B29D 11/0048* (2013.01); *G01N 2021/8822* (2013.01); *G01N 2201/0626* (2013.01); *G06T 2207/10148* (2013.01); *G06T 2207/10152* (2013.01); *G06T 2207/30168* (2013.01)

(58) Field of Classification Search
CPC ..... G06T 5/50; B29C 33/70; B29C 2033/705; G06K 9/2054; G06K 9/38; H04N 5/2256; B29D 11/00038; B29D 11/00951; B29D 11/0048; G01N 2021/887; G01N 21/8851; G01N 21/8806; G01N 21/95; G01N 2021/8822; G01N 2201/0626
See application file for complete search history.

(56) References Cited

U.S. PATENT DOCUMENTS

| | | | |
|---|---|---|---|
| 10,027,928 B2 * | 7/2018 | Pavani | ............... G01N 21/9501 |
| 2007/0139640 A1 * | 6/2007 | Biel | ........................ G01M 11/02 356/124 |
| 2013/0031760 A1 | 2/2013 | Wang | |
| 2013/0169955 A1 * | 7/2013 | Vertoprakhov | .... G01M 11/0278 356/124 |
| 2017/0011507 A1 * | 1/2017 | Wong | ................. G01M 11/0278 |

* cited by examiner

METHOD AND APPARATUS FOR OPTICALLY INSPECTING A MOLD FOR MANUFACTURING OPHTHALMIC LENSES FOR POSSIBLE MOLD DEFECTS

This application claims the benefit under 35 USC § 119 (e) of U.S. provisional application Ser. No. 62/718,064 filed Aug. 13, 2018, incorporated herein by reference in its entirety.

FIELD OF THE INVENTION

The present invention generally relates to a method and an apparatus for optically inspecting a mold used for manufacturing ophthalmic lenses, in particular contact lenses, for possible mold defects.

BACKGROUND OF THE INVENTION

In mass production of ophthalmic lenses, in particular contact lenses such as soft contact lenses, lens molding with single-use molds or re-usable molds is well established. In such lens molding processes, a lens-forming material is introduced into a female mold which is then closed by a corresponding male mold. Subsequently, the lens-forming material is cured, for example using ultraviolet (UV) light, to form a lens. Integrity of the mold is crucial for an appropriate quality of the molded lens. Otherwise, mold defects, for example scratches or holes in the mold surface, may result in that the lens or even all lenses produced by such mold are rejected. In particular re-usable molds such as glass molds are prone to mold defects due to their repeated use. To avoid needless mass production of unacceptable lenses, such molds, in particular reusable molds, are inspected for imperfections prior to being released for the manufacturing process. Typically, mold inspection is performed by experienced persons, sometimes with the help of optical inspection means. However, this kind of inspection is neither standardized nor objective, but rather is dependent on the experience of the persons performing the inspections.

It is therefore an object of the present invention to provide a method and an apparatus for optically inspecting a mold used for manufacturing ophthalmic lenses, in particular contact lenses, for possible mold defects in a reliable, objective and standardized manner.

SUMMARY OF THE INVENTION

In accordance with the present invention, these and other objects are met by a method and an apparatus as it is specified by the features of the independent claims. Advantageous embodiments of the method and the apparatus according to the invention are the subject of the dependent claims.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value A to "about" numerical value B is disclosed, this is to be understood to include and explicitly disclose a range of numerical value A to numerical value B. Also, whenever features are combined with the term "or", the term "or" is to be understood to also include "and" unless it is evident from the specification that the term "or" must be understood as being exclusive.

According to the invention, a method for optically inspecting a mold for manufacturing ophthalmic lenses, in particular contact lenses, for possible mold defects is suggested. The method comprises the steps of:

a. taking an image of the mold along a center axis of the mold that extends through an apex of the mold and normal to a mold surface at the apex by
   illuminating the mold with light incident at an azimuthal illumination angle and a polar illumination angle with regard to the center axis, and
   collecting and detecting light reflected or scattered, respectively, from the mold using an imaging system arranged along and aligned with the center axis, wherein a focal plane of the imaging system has an axial position along the center axis in the range of the mold;

b. repeating step a. for one or a plurality of different azimuthal angles around the center axis at the same polar illumination angle and the same axial position of the focal plane to generate a plurality of images of the mold;

c. generating a masked dark field image for each image of the plurality of images taken at the different azimuthal illumination angles at the same axial position of the focal plane by applying a respective specular reflection mask to each image of the plurality of images of the mold such as to mask out image regions that include direct specular reflections from the mold, so as to obtain a plurality of masked dark field images;

d. generating a focal plane image for the axial position of the focal plane by averaging pixelwise over the masked dark field images generated at the different azimuthal illumination angles at the same axial position of the focal plane;

e. repeating steps a. to d. for one or a plurality of different axial positions of the focal plane to generate a plurality of different focal plane images;

f. identifying one or more image features in the plurality of different focal plane images, each image feature showing a possible mold defect;

g. determining for each identified image feature a respective sharpest focal plane image of the plurality of different focal plane images by determining for which focal plane image of the plurality of different focal plane images a pre-defined sharpness measure of the identified image feature is at a maximum;

h. generating for each identified image feature a respective image section out of the respective sharpest focal plane image, wherein the identified image section includes the identified image feature;

i. generating a composed dark field image of the mold by composing the respective image sections for each identified image feature such as to enable determination as to whether the possible defects of the mold allow the mold to be used for manufacturing ophthalmic lenses.

According to one aspect of the method according to the invention, the step of identifying one or more image features in the plurality of different focal plane images may include
   defining a pixel value threshold between background and non-background image data;
   generating a binary identification image of the same size as that of the plurality of different focal plane images by setting a respective pixel of the binary identification image to a first value if a pixel value of a corresponding pixel of at least one of the focal plane images is above the pixel value threshold, and by setting a respective pixel of the binary identification image to a second value if a pixel value of a corresponding pixel of all focal plane images is below the pixel value threshold;

identifying in the binary identification image one or more pixel patterns consisting of a singular pixel or a plurality of connected pixels set to the first value;

determining for each focal plane image and each identified pixel pattern of the binary identification image whether one or more pixels of the focal plane image within a respective image portion corresponding to a respective one of the identified pixel patterns of the binary identification image have a pixel value that is above the pixel value threshold, and identifying the possibly determined one or more pixels in the focal plane image as an image feature showing a possible mold defect.

According to a further aspect of the method according to the invention, the step of identifying one or more image features further may include defining for each identified image feature a respective region of interest around the identified image feature such that the image feature, in particular a corresponding pixel pattern identified in the binary identification image, is included in the region of interest at least for each focal plane image showing the identified image feature.

In accordance with yet a further aspect of the method according to the invention, the pre-defined sharpness measure of each identified image feature may be determined within the respective region of interest only.

According to a further aspect of the method according to the invention, for each identified image feature the respective image section of the respective sharpest focal plane image may correspond to the respective region of interest.

According to still a further aspect of the method according to the invention, the step of generating a focal plane image may include applying a depth-of-field mask after averaging over the masked dark field images such as to mask out non-sharp image regions showing mold portions which are outside a focal range of the imaging system at the respective axial position of the focal plane.

In accordance with another aspect of the method according to the invention, the depth-of-field mask may be determined by the geometry of the mold, the focal range and a focal length of the imaging system.

In accordance with a further aspect of the method according to the invention, step b. may include repeating step a. such as to take at least three, in particular at least ten, preferably at least fourteen images of the mold corresponding to at least three, in particular at least ten, preferably at least fourteen azimuthal illumination angles, which preferably are angularly equidistantly distributed around the center axis.

According to another aspect of the method according to the invention, step e. may include repeating steps a. to d. such as to generate at least three, in particular at least ten, preferably at least fourteen focal plane images corresponding to at least three, in particular at least ten, preferably at least fourteen axial positions of the focal plane of the imaging system, which preferably are distributed along the center axis.

According to still a further aspect of the method according to the invention, the polar illumination angle may be in the range of 1° to 89°, in particular 5° to 45°, preferably 15° to 25°.

According to a further aspect of the method according to the invention, the imaging system may have a depth of field of at least 100 µm, in particular 250 µm or more, and/or the imaging system may have a spatial optical resolution of 10 µm×10 µm, or below, in particular of 6 µm×6 µm or below, or 3 µm×3 µm or below.

According to yet a further aspect of the method according to the invention, the imaging system may comprise an objective and an imaging sensor having a plurality of pixels. Preferably, the pixel size is in a range between 5 µm×5 µm and 7 µm×7 µm.

According to still a further aspect of the method according to the invention, the mold may be successively illuminated by a plurality of LEDs each configured and arranged for illuminating the mold at a respective one of the different azimuthal illumination angles.

In accordance with another aspect of the method according to the invention, the pre-defined sharpness measure of the identified image feature may be determined on the basis of the Sobel operator.

In accordance with yet another aspect of the method according to the invention, the mold may be illuminated and imaged at a concave side of the mold in case the mold is a female mold, and wherein the mold is illuminated and imaged at a convex side of the mold in case the mold is a male mold.

According to the invention, there is also suggested an apparatus for optically inspecting a mold for manufacturing ophthalmic lenses, in particular contact lenses, for possible mold defects. In particular, the apparatus may be used for carrying out a method according to the present invention and as described herein. The apparatus comprises:

a mold holder configured to hold the mold in a pre-defined position such that a center axis of the mold that extends through an apex of the mold and normal to a mold surface at the apex is aligned with a mounting axis of the mold holder;

an illumination system configured to illuminate the mold with light incident at a polar illumination angle and at different azimuthal illumination angles with regard to the mounting axis; and an imaging system arranged along and aligned with the mounting axis and configured to collect and detect light reflected or scattered, respectively, from the mold, wherein the imaging system is further configured to adjust a focal plane of the imaging system at different axial positions along the mounting axis in the range of the mold when being held by the mold holder.

According to one aspect of the apparatus according to the invention, the apparatus may further comprise a dome covering the mold holder and having an axis of symmetry that extends through an apex of the dome and that is aligned with the mounting axis.

According to a further aspect of the apparatus according to the invention, the dome may comprise a plurality of illumination openings circumferentially arranged around the axis of symmetry at different azimuthal positions according to the polar illumination angle and the different azimuthal illumination angles, with a light source being arranged in each illumination opening of the plurality of illumination openings.

In accordance with yet a further aspect of the apparatus according to the invention, the dome may comprise a central imaging opening at the apex of the dome, with the imaging system being arranged in the central imaging opening.

According to a further aspect of both, the method and the apparatus according to the present invention, the imaging system may comprise an objective and an imaging sensor having a plurality of sensor pixels.

Both, the method and the apparatus according to the present invention have a number of advantages. First, by illuminating the mold with light incident at a specific polar illumination angle with regard to the center axis of the mold while collecting and detecting light reflected/scattered from the mold along the center axis, the method and the apparatus according to the present invention generally benefits from the advantages of dark field imaging. In particular, the method and the apparatus advantageously implement the principles of reflected-light dark-field illumination where illumination and imaging take place at the same side of the inspected specimen, yet along separate beam paths. In general, dark-field imaging is a contrast imaging technique using only light that is scattered from the inspected specimen to form an image. For this, the angle of incidence of the illumination light relative to the optical axis of the imaging system preferably is chosen such that only light scattered from the inspected specimen enters the imaging system, whereas direct specular reflections substantially pass by. As a result, smooth and highly reflective surfaces appear dark in the image, whereas defects such as scratches or deposits appear bright. As a consequence, possible defects are highlighted and can be more easily recognized or detected, in particular by using standardized image processing methods.

While this generally holds for specimen having substantially flat surfaces, curved surfaces typically reflect/scatter incident light into a plurality of directions, in particular such that direct specular reflections may still enter the imaging system. Accordingly, due to the curved surface portions of molds used for manufacturing ophthalmic lenses, images of such molds might still include direct specular reflections when using the method and the apparatus according to the present invention. In addition, the images may also include (non-specular) scattering light artefacts. In order to mask out image regions including possible direct specular reflections from the mold and possibly also scattering light artefacts, the present invention advantageously provides the step of applying a respective specular reflection mask to each image taken such as to generate a masked dark field image showing no direct specular reflections and possibly also no scattering light artefacts. Preferably, the specular reflection mask is part of an imaging (post-) processing, in particular a computational imaging (post-) processing. For this, the apparatus according to the invention may comprise an image processing unit. In order to minimize the amount of direct specular reflections entering the imaging system, the polar illumination angle preferably is chosen such as to be in the range of 1° to 89°, in particular 5° to 45°, preferably 15° to 25°.

Furthermore, the method and the apparatus according to the present invention provide for taking a plurality of images with light incident at a plurality of different azimuthal illumination angles around the center axis of the mold or the mounting axis of the mold holder, respectively. Advantageously, this allows for detecting any possible mold defect in a fixed direction of observation, that is, with the imaging system being fixedly aligned along the center axis of the mold. Otherwise, if the mold was illuminated with light incident along a fixed direction, proper inspection for defect would usually require different directions of observation as different mold defects typically scatter incident illumination light into different directions depending on the specific structure of the defect. In addition, taking a plurality of images with light incident at a plurality of different azimuthal illumination angles advantageously enhances the contrast in the final image, in particular due to an enhancement of shadowing effects. As a result, defect structures extending in a plurality of different directions can be better identified.

The probability of properly detecting a specific mold defect increases with the number of images taken at different azimuthal illumination angles. Accordingly, the step of taking an image at a specific azimuthal illumination angle is repeated for different azimuthal illumination angles such as to take at least three, in particular at least ten, preferably at least fourteen images of the mold corresponding to at least three, in particular at least ten, preferably at least fourteen azimuthal illumination angles at the same polar angle and at the same axial position of the focal plane. Preferably, the azimuthal illumination angles or azimuthal illumination positions preferably are angularly equidistantly (i.e. equally) distributed around the center axis of the mold or the mounting axis of the mold holder, respectively. As used herein, the azimuthal illumination angle is measured with regard to a pre-defined reference axis that extends in a pre-defined radial direction in a plane perpendicular to the center axis of the mold or the mounting axis of the mold holder, respectively.

Preferably, the mold is successively illuminated by a plurality of LEDs each configured and arranged for illuminating the mold at a respective one of the different azimuthal illumination angles. Accordingly, the apparatus according to the present invention may comprise a dome covering the mold holder, wherein the dome has an axis of symmetry that extends through an apex of the dome and that is aligned with the mounting axis of the mold holder. The dome may comprise a plurality of illumination openings circumferentially arranged around the axis of symmetry at different azimuthal positions according to the given polar illumination angle and the different azimuthal illumination angles. The LEDs mentioned above may be arranged in these illumination openings or may be attached at corresponding positions at the inner surfaces of the dome such that they face the mold holder. Alternatively, the LEDs may be arranged outside the dome such as to illuminate the mold through the illumination openings of the dome. In addition to the illumination openings, the dome may comprise a central imaging opening at the apex of the dome allowing light reflected/scattered from the mold to pass through or allowing the imaging system to be arranged therein.

The specular reflection mask—as described above—is applied to each one of the images taken at the different azimuthal illumination angles. Many molds used for manufacturing ophthalmic lenses, such as contact lenses, are substantially rotationally symmetric with regard to center axis of the mold. For this reason, the specular reflection masks for the plurality of images taken at the different azimuthal illumination angles may be identical with regard to the shape of mask, yet applied to each image taken with a respective different rotational position corresponding to the respective azimuthal illumination angle associated to the respective image. For example, the shape of the specular reflection masks may comprise at least one wedge-shaped segment or segment of a circle. Preferably, the shape of the specular reflection masks may comprise two wedge-shaped segments or segments of a circle, wherein the tips of both wedge-shaped segments face each other or coincide and wherein both segments are symmetrically aligned along a centerline extending through a center of the imaged mold, that is, through an image point representing the center axis of the mold. Furthermore, the two segments may be identical or may be different in size and/or shape. In case of wedge-shaped segments or segments of a circle, the lateral boundaries of the segments may enclose an angle in the range of 20° to 334°, in particular of 30° to 65°.

As used herein, the term "masking out image region(s)" may include deleting image data of the respective image region(s) or setting the pixel values of the respective image region(s) to the predefined background value. The term "pixels" preferably refers to image pixels of the image taken by the imaging system, that is, to image elements or points the image taken is composed of, for example an array of pixels. For example, when using an imaging system that includes an imaging sensor having a plurality of sensor pixels, the image pixels of the image taken by the imaging system result from and thus correspond to the sensor pixels of the imaging sensor. Likewise, the image taken may be virtually sectioned into a plurality of image pixels according to a pre-defined pixel array pattern.

The step of applying a respective specular reflection mask results in a plurality of masked dark field images each being associated to a respective different azimuthal illumination angle, yet to the same polar illumination angle and the same axial position of the focal plane of the imaging system.

Subsequent to the step of taking a plurality of images for different azimuthal illumination angles and applying a respective specular reflection mask to each image taken, an "averaged" dark field image is generated by averaging pixelwise over the plurality of masked dark field images generated for different azimuthal illumination angles. As averaging is applied over all masked dark field images taken at the same axial position of the focal plane, the resulting average dark field image is denoted as focal plane image within the present invention.

Preferably, the images taken at different azimuthal illumination angles are taken with maximal spatial resolution in order to detect even smallest mold defects. However, high spatial resolution may only be achieved at the expense of a reduced depth of field. To compensate for the reduced depth of field, the method according to the present invention provides the step of repeating the aforementioned steps for one or a plurality of different axial positions of the focal plane such as to generate a plurality of different focal plane images. Accordingly, the imaging system of the apparatus according to the present invention is configured to adjust a focal plane of the imaging system at different axial positions along the mounting axis in the range of the mold when being held by the mold holder. Here, the term "within the range of the mold" includes at least those axial positions in which the focal plane of the imaging system cuts through the mold.

As used herein, the term "depth of field" refers to the range about the focal plane of the imaging system where objects appear acceptably sharp in the image. Preferably, the imaging system according to the method and the apparatus of the present invention has a depth of field of at least 100 µm. Likewise, the imaging system preferably has a spatial optical resolution of 6 µm or below, in particular of 3 µm or below.

Advantageously, the imaging system is scanned through different axial positions of the focal plane along the center axis such as to generate at least three, in particular at least ten, preferably at least fourteen focal plane images corresponding to at least three, in particular at least ten, preferably at least fourteen axial positions of the focal plane of the imaging system. Preferably, the different axial positions of the focal plane are equidistantly distributed along the center axis.

Subsequent to generating the plurality of different focal plane images, the method according to the present invention includes identifying one or more image features in the plurality of different focal plane images, wherein each image feature shows a possible mold defect. Preferably, identification of possible image features may be accomplished by defining a pixel value threshold between background and non-background image data. The threshold may be defined on the basis of a pre-defined background value which may be achieved by taking a reference image without illumination light. Subsequently, a binary identification image is generated having the same size as each of the plurality of different focal plane images. For this, a respective pixel of the binary identification image is set to a first value if a pixel value of a corresponding pixel of at least one of the focal plane images is above the pixel value threshold, and is set to a second value if a pixel value of a corresponding pixel of all focal plane images is below the pixel value threshold. After that, one or more possible pixel patterns are identified in the binary identification image which either consist of a singular pixel or a plurality of connected pixels set to the first value. Finally, for each focal plane image and each identified pixel pattern of the binary identification image, it is determined whether one or more pixels of the focal plane image within a respective image portion—corresponding to a respective one of the identified pixel patterns of the binary identification image—have a pixel value that is above the pixel value threshold. Consequently, the possibly determined one or more pixels in the focal plane image is identified, that is, considered as an image feature showing a possible mold defect.

In order to reduce the image data to be processed, the step of identifying one or more image features advantageously may include defining for each identified image feature a respective region of interest around the image feature such that the image feature, in particular a corresponding pixel pattern identified in the binary identification image, is included in the region of interest at least for each focal plane image showing the said image feature.

For each identified image feature, a respective sharpest focal plane image out of the plurality of different focal plane images is determined. For this, it may be determined for which focal plane image out of the plurality of different focal plane images a pre-defined sharpness measure of the image feature is at a maximum. Preferably, the pre-defined sharpness measure of the image feature is determined within the respective region of interest only. Advantageously, this reduces the computational resources and time for determining the sharpness measure.

The sharpness measure preferably is based on determining a gradient from an identified image feature to the surrounding image portions showing background only. The steeper the gradient, the sharper the image of the image feature within the respective focal plane image. Determining the gradient may, for example, involve application of a Sobel operator, sometimes also called Sobel-Feldman operator or Sobel filter. The Sobel operator is a discrete differentiation operator computing an approximation of the gradient of the image intensity function. At each point in the image, the result of the Sobel operator is either the corresponding gradient vector or the norm of this vector. The Sobel operator typically is based on convolving the image with a small, separable and integer-valued filter in two perpendicular directions (x- and y-direction). Preferably, the sharpness measure may be given by the variance of the squared gradient image, that is, the $VAR[(Sobel\ operator\ in\ x\text{-}direction)^2 + (Sobel\ operator\ in\ y\text{-}direction)^2]$. The larger the variance, the sharper the edge of the image feature within a respective focal plane image and, thus, the sharper the image feature within a respective focal plane image.

After determining the respective sharpest focal plane image for each identified image feature, a respective image section out of the respective sharpest focal plane image is determined for each identified image feature. The dimensions of the image section are chosen such that the image section includes the identified image feature. Preferably, the image sections for the different identified image features do not overlap. Possibly, the image sections may correspond to the respective regions of interest for the respective identified image features. The image sections for different image features may be identical or may be different in size and/or shape.

In a final step, a composed dark field image of the mold is generated that includes the respective image sections for each identified image feature. The composed dark field image may exclusively include the respective image sections including the identified image features. Other regions of the composed dark field image may be either empty or show a predefined background. Advantageously, the thus composed dark field image enables determination as to whether the possible defects of the mold allows the mold to be used for manufacturing ophthalmic lenses.

To perform the image processing described above, that is, identifying one or more image features, determining a respective sharpest focal plane image, generating a respective image section for each identified image feature and generating a composed dark field image, the apparatus according to the present invention may include an image processing unit, for example a computer, which is in operational communication with the imaging system and the illumination system. The apparatus may further comprise a controller for controlling the operation of the illumination system and the imaging system. The image processing unit may be part of the controller.

A further reduction of computational resources and time may be achieved by excluding those image regions of the masked dark field images which are outside a focal range of the imaging system at the respective axial position of the focal plane. Accordingly, the step of generating a focal plane image may include applying a depth-of-field mask after averaging over the masked dark field images such as to mask out non-sharp image regions. In particular, the depth-of-field mask may be determined on the basis of the geometry and shape of the mold as well as on the focal range and the focal length of the imaging system.

Of course, the step of determining a respective sharpest focal plane image out of the plurality of different focal plane images may be achieved by applying a depth-of-field mask. Preferably, this depth-of-field mask is configured such as to generate for each focal plane image a respective image section that fulfils a predefined sharpness criterion derived from the geometry and shape of the mold as well as from the focal range and the focal length of the imaging system. Preferably, the image section corresponds to that part of a focal plane image which represents a respective part of the mold that is within the focal depth of the imaging system at the given axial position of the focal plane associated to the focal plane image. Accordingly, the respective sharpest focal plane image is exclusively determined on the basis of optical and geometrical information on the imaging system and the mold, respectively. Preferably, the image sections are chosen such as to have no overlap. Advantageously, this allows for directly generating the composed dark field image from those image sections being exclusively determined on the basis of optical and geometrical information.

BRIEF DESCRIPTION OF THE DRAWINGS

Further advantageous aspects of the invention become apparent from the following description of embodiments of the invention with the aid of the drawings, in which:

FIG. 1 schematically illustrates an exemplary embodiment of the general setup of the apparatus 1 and the method according to the present invention, allowing for optically inspecting a mold 10 for manufacturing ophthalmic lenses for possible mold defects. According to the invention, the apparatus 1 includes a mold holder 5 that is configured to hold the mold 10 in a pre-defined position such that a center axis Z of the mold 10—which extends through an apex 15 of the mold 10 normal to a mold surface 16 at the apex 15—is coaxially aligned with a mounting axis M of the mold holder 10. In FIG. 1, the mold holder 5 is only schematically represented by a baseplate-like object on which a male mold 10 for manufacturing a soft contact lens is mounted.

Figure 1:
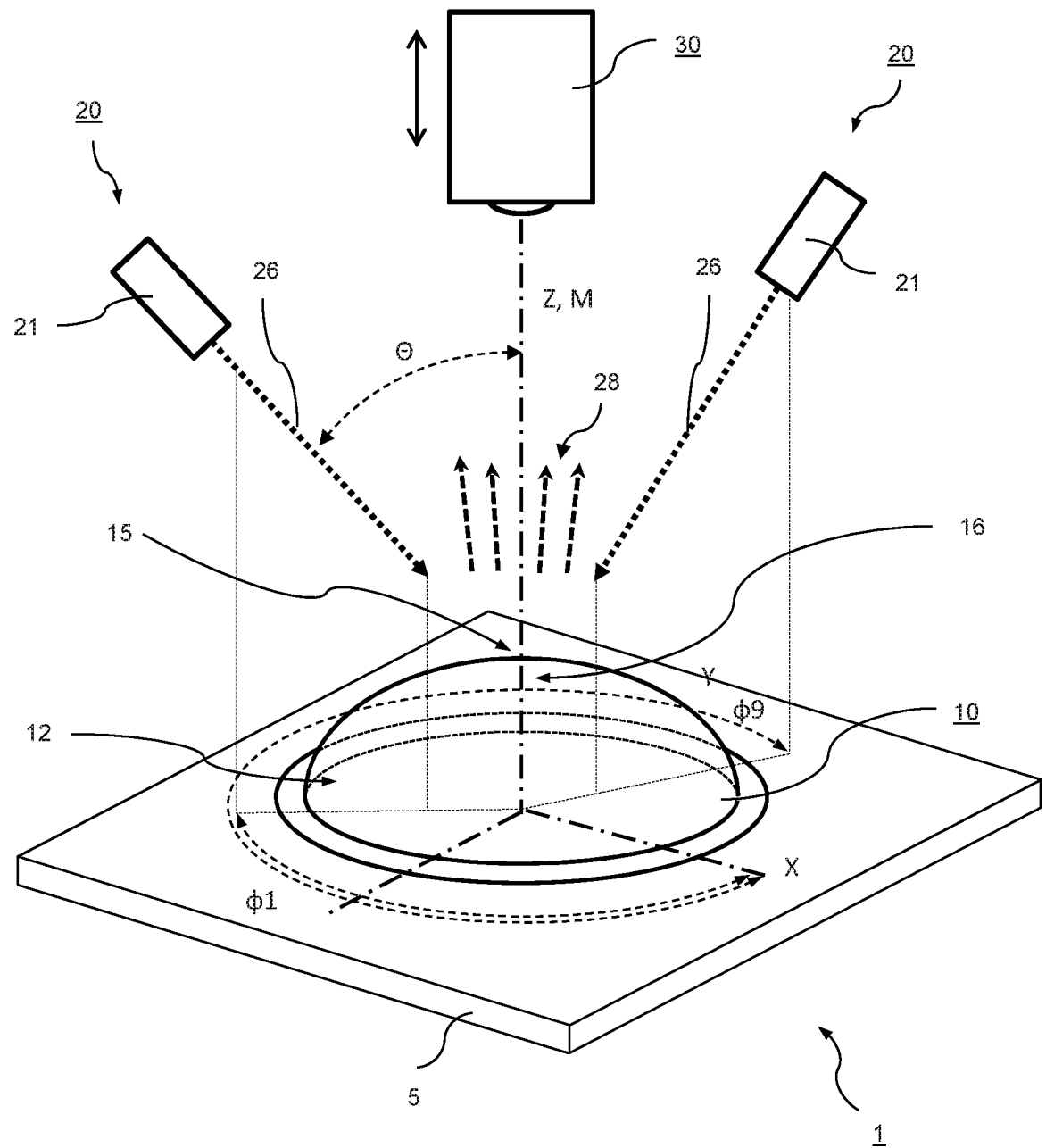
FIG. 1 schematically illustrates an exemplary embodiment of the general setup of the apparatus and the method according to the present invention.

According to the invention, the apparatus 1 further comprises an illumination system 20 configured to illuminate the mold 10 with light 26 incident at a polar illumination angle Θ and at different azimuthal illumination angles, with two of these azimuthal illumination angles $\phi1$, $\phi9$ being shown in FIG. 1 by way of example. As indicated, the azimuthal illumination angles $\phi1$, $\phi9$ are measured with regard to a pre-defined reference axis X that extends in a pre-defined radial direction in a plane perpendicular to the center axis Z of the mold 10 and the mounting axis M of the mold holder 5, respectively.

Figure 11:
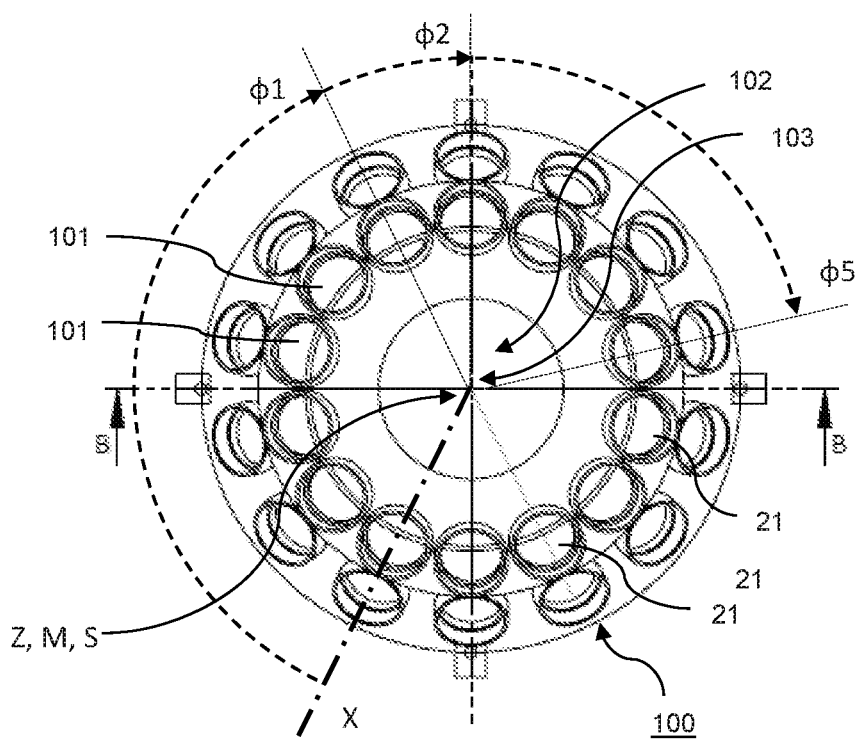
FIG. 11 is a top view of an exemplary embodiment of a dome provided within the apparatus according to the invention.
Figure 12:
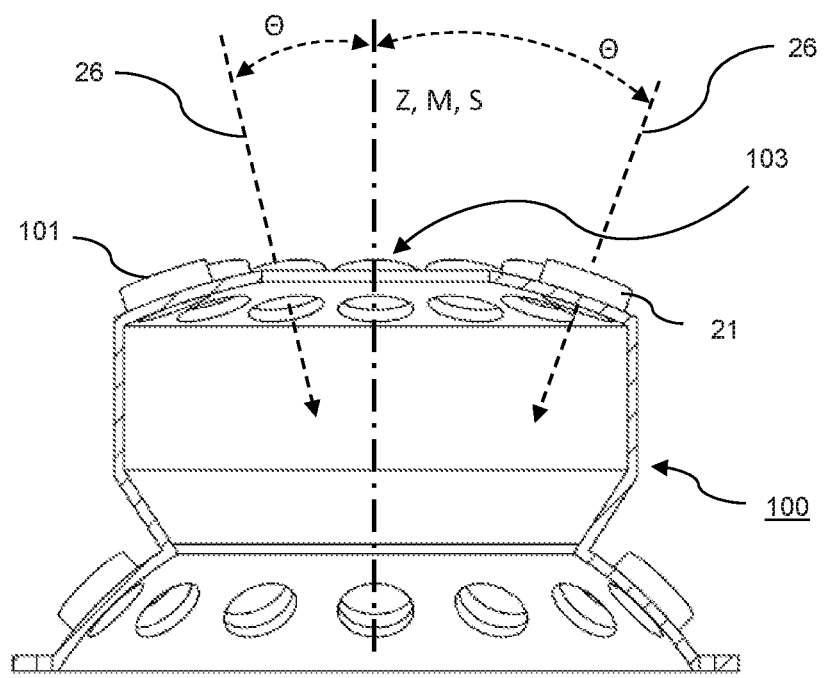
FIG. 12 is a cross-sectional view of the dome according to FIG. 11 along line B-B.

For illuminating the mold 10 at different azimuthal illumination angles, the illumination system 20 may comprise a plurality of light sources 21 which are circumferentially arranged around the mounting axis M and the center axis Z, respectively. In FIG. 1 only two of these light sources 21 are shown by way of example in order to keep the drawing simple. Preferably, the light sources 21 are equally distributed around the mounting axis and the center axis Z, respectively. The number of light sources corresponds to the number azimuthal illumination angles the mold is to be illuminated at. As shown in FIG. 11 and FIG. 12 the illumination system 20 may comprise, for example, a total number of fourteen light sources 21, such as LEDs, each arranged in a respective one of fourteen illumination openings 101 provided in a dome 100 that is arranged above the mold holder 5. The illumination openings 101 are circumferentially arranged around an axis of symmetry S of the dome 100, at different azimuthal positions ϕ1, ϕ2, . . . , ϕ5, . . . according to the different azimuthal illumination angles the mold is to be illuminated at. The axis of symmetry S of the dome 100 is coaxially aligned with the mounting axis M and the center axis Z. The light sources 21 are arranged in the illumination openings 101 such that each light source 21 emits its light (symbolized by dashed arrows 26) at the polar illumination angle Θ.

According to the invention, the apparatus 1 further comprises an imaging system 30 arranged along and aligned with the mounting axis M and configured to collect and detect light 28 reflected/scattered from the mold 10. As can be particularly seen from FIG. 2, the imaging system 30 is configured to adjust a focal plane 31 of the imaging system 30 so as to be arranged at different axial positions z1, z2, z3, . . . along the mounting axis M and the center axis Z of the mold 10, respectively. In particular, the imaging system 30 may be configured to adjust the focal plane 31 at least within the range of the mold 10 when being held by the mold holder 5. As used herein, the term "within the range of the mold" includes at least those axial positions in which the focal plane cuts through the mold 10. Adjustability of the focal plane at different axial positions may be achieved, for example, by mounting the imaging system 30 to a linear translation mechanism (not shown), or by any other suitable measure. Advantageously, this allows for readily taking a plurality of focal plane images at different axial positions. According to a preferred embodiment, the imaging system 30 may comprise an imaging sensor having a plurality of sensor pixels, for example it may be a CCD camera (not shown). For collecting and directing light 28 reflected/scattered from the mold 10 towards the imaging sensor, the imaging system 30 may further comprise an objective (not shown) including, for example, one or more optical lenses. Furthermore, when using a dome 100 as shown in FIG. 11, the imaging system 30 may be arranged within a central opening 102 at the apex 103 of the dome 100.

Figure 2:
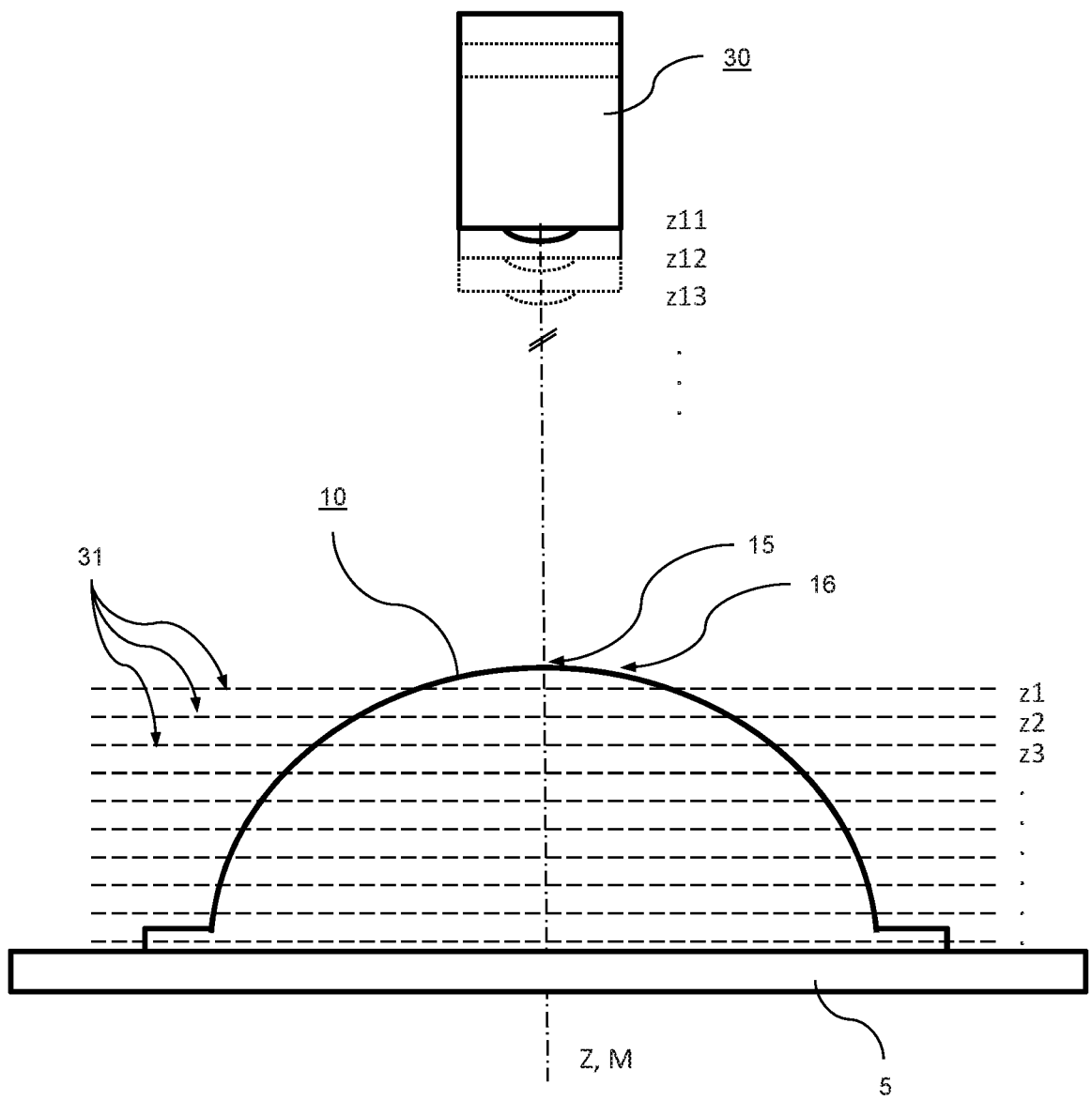
FIG. 2 schematically illustrates the step of taking a plurality of focal plane images for different axial positions of the focal plane of the imaging system using the setup according to FIG. 1.
Figure 3:
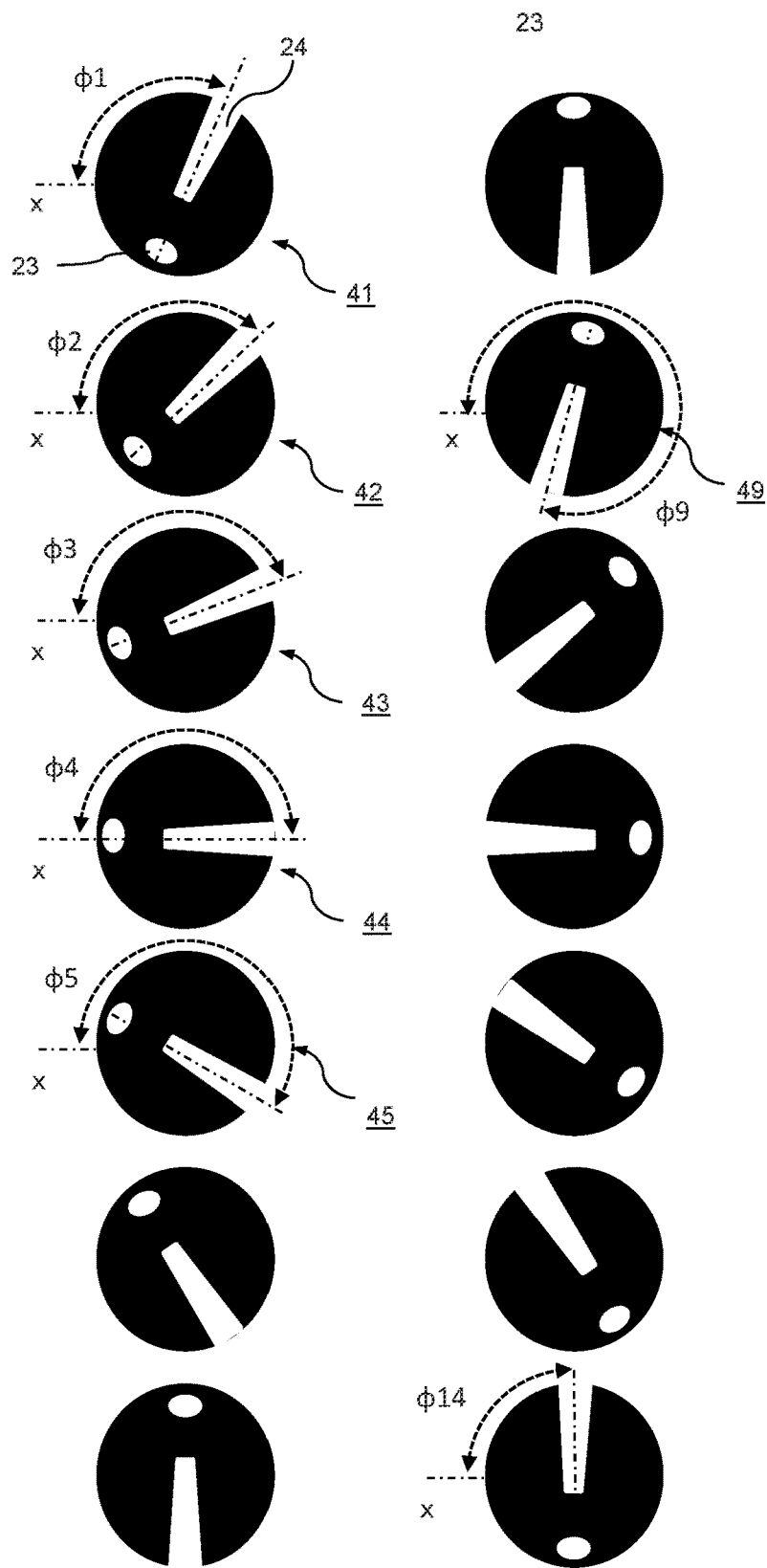
FIG. 3 shows an exemplary set of images taken with the setup according to FIG. 1 for different azimuthal illumination angles.
Figure 4:
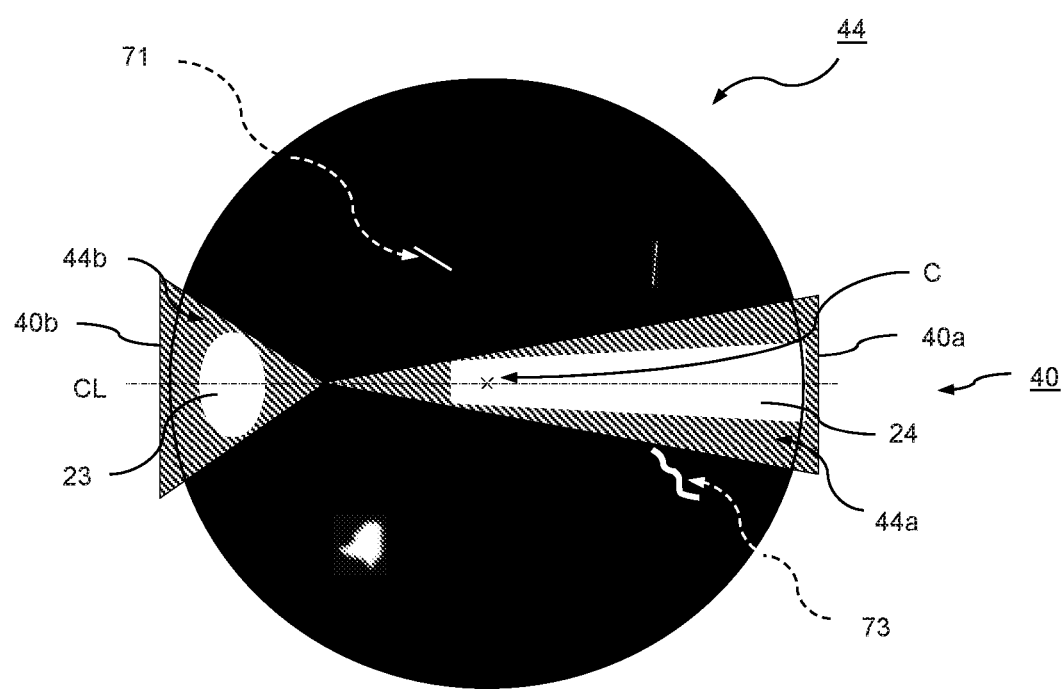
FIGS. 4-5 schematically illustrate the step of generating a masked dark field image by applying a specular reflection mask to one of the images shown in FIG. 3.

With reference to FIGS. 3 to 9, an exemplary embodiment of the method according to the present invention using the setup of the apparatus 1 shown in FIGS. 1 and 2 will now be described in detail. The method starts with taking a plurality of single images of the mold 10 for different azimuthal illumination angles ϕ1, ϕ2, ϕ3, ϕ4, ϕ5 . . . , ϕ9, . . . of the incident light 26. For this, the mold 10 is illuminated successively with light 26 emitted by a respective one of the light sources 21 at a respective one of the plurality of different azimuthal illumination angles. While the azimuthal illumination angle is varied, the polar illumination angle Θ is the same for all light sources 21. For each single illumination process at a receptive one of the azimuthal illumination angles, light 28 reflected/scattered from the mold 10 is collected and detected by the imaging system 30. For this, the imaging system 30 is arranged along and aligned with the center axis Z of the mold 10 such that the focal plane 31 of the imaging system 30 is cutting through the mold 10 at a specific axial position z1 along the center axis Z (see FIG. 2) which is the same axial position z1 for the afore-described illumination at the different azimuthal illumination angles. In the present embodiment, fourteen single "azimuthal" images 41, 42, 43, 44, 45, . . . , 49 . . . corresponding to fourteen different azimuthal illumination angles ϕ1, ϕ2, ϕ3, ϕ4, ϕ5, . . . , ϕ9, . . . ϕ14 are taken, as shown in FIG. 3.

Figure 5:
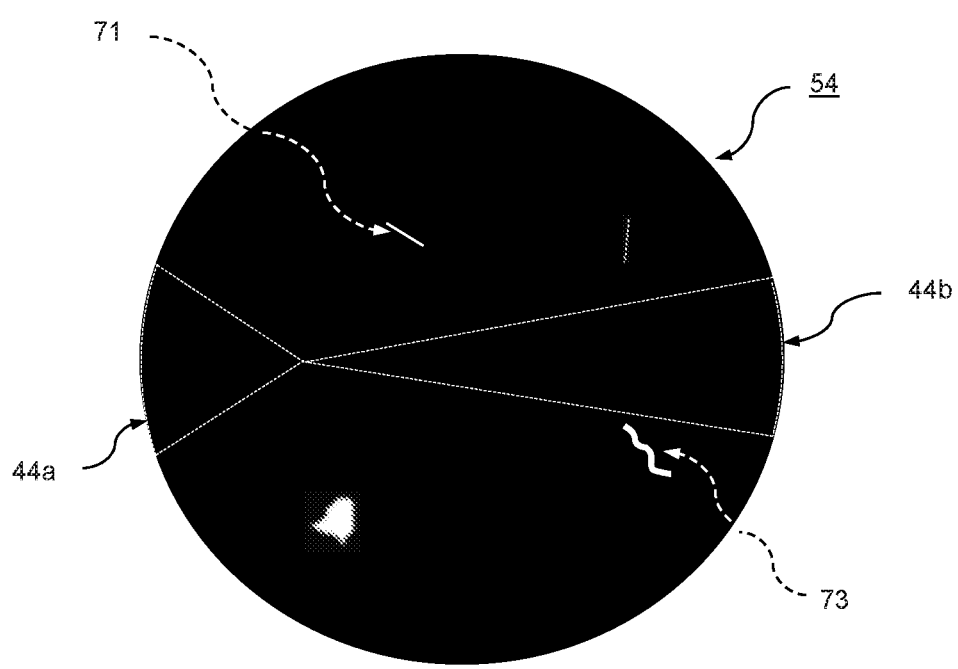

As described above, the images 41, 42, 43, 44, 45, . . . , 49, . . . taken at the plurality of azimuthal illumination angles ϕ1, ϕ2, ϕ3, ϕ4, ϕ5, . . . , ϕ9, . . . ϕ14 may still include direct specular reflections 23, 24 (white areas in the images shown in FIG. 3) which are due to the curved surface of the mold 10 causing the incident light 26 being reflected into a plurality of directions. In order to mask out those image regions including direct specular reflections 23, 24, the method according to present invention provides the step of applying a respective specular reflection mask 40 to each image taken such as to generate a respective masked dark field image showing no direct specular reflections. This masking out is exemplarily illustrated in FIG. 4 and FIG. 5 with regard to the "azimuthal" image 44 shown in FIG. 3 taken at the azimuthal illumination angle ϕ4. In the present embodiment, the specular reflection mask 40 includes two wedge-shaped mask segments 40a, 40b of different sizes (hatched triangular areas in FIG. 4) which are symmetrically aligned along a common centerline CL extending through the center C of the imaged mold in the image 44 such that the tips of the two segments 40a, 40b face each other or coincide. The diverging lateral boundaries of segment 40a enclose an angle of about 40°, whereas the lateral boundaries of segment 40b enclose an angle of about 65°. Application of the specular reflection mask 40 causes the pixel values of the two image regions 44a and 44b of image 44 which are covered by the wedge-shaped mask segments 40a and 40b to be set to a predefined background value. In the same manner, a respective specular reflection mask 40 is applied to the other images 41, 42, 43, 45, . . . , 49, . . . taken at the other azimuthal illumination angles ϕ1, ϕ2, ϕ3, ϕ5, . . . , ϕ9, . . . ϕ14. Due to the rotational symmetry of the mold and the illumination-imaging setup, the specular reflection mask 40 may be identical for all fourteen images 41, 42, 43, 44, 45, . . . , 49, . . . as regards the general shape of the mask. Yet, the mask 40 is applied to each image 41, 42, 43, 44, 45, . . . , 49, . . . at a respective different rotational position of the mask corresponding to the respective azimuthal illumination angle ϕ1, ϕ2, ϕ3, ϕ4, ϕ5, . . . , ϕ9, . . . ϕ14 associated to the respective image 41, 42, 43, 44, 45, . . . , 49, . . . . The result of this masking out is illustrated in FIG. 5 which exemplarily shows a masked dark field image 54 generated from image 44. For demonstration purposes only, the masked out image regions 44a and 44b (set to background value) are I indicated by dashed lines.

Figure 6:
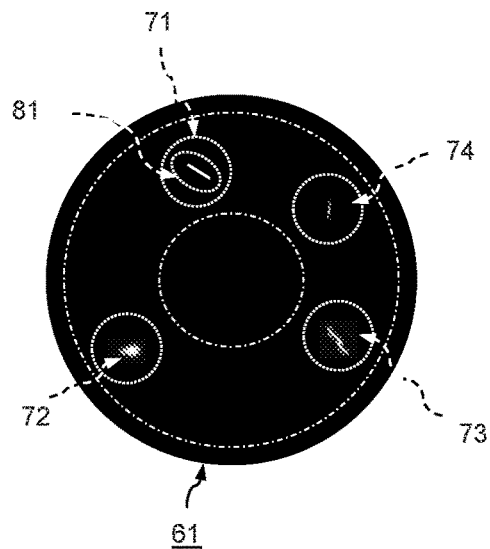
FIGS. 6-8 show an exemplary set of three different focal plane images associated to three different axial positions of the focal plane of the imaging system.

After generation of a masked dark field image 54 for each of the fourteen "azimuthal" images 41, 42, 43, 44, 45, . . . , 49, . . . the method according to the present invention further provides the step of generating a single focal plane image 61 by averaging pixelwise over all masked dark field images 54 that are associated to the specific axial position z1 of the focal plane 31 at which the fourteen "azimuthal" images 41, 42, 43, 44, 45, . . . , 49, . . . were taken. An example of such a focal plane image 61 is shown in FIG. 6.

Figure 7:
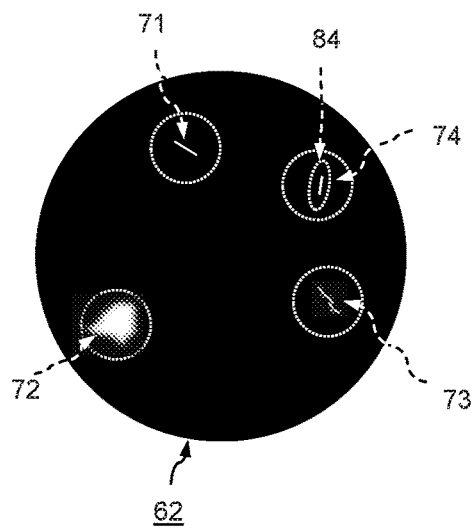
Figure 8:
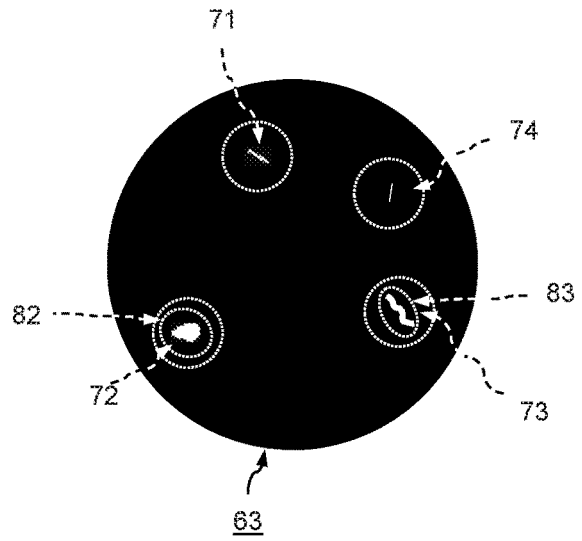

Subsequently, all previous steps as described above, that is, taking a set of single "azimuthal" images at different azimuthal illumination angles, generating a masked dark field image for each "azimuthal" image and generating a focal plane image out of all masked dark field images associated to a specific axial position of the focal plane, are repeated for a plurality of different axial positions z2, z3, . . . of the focal plane 31. Advantageously, this allows for compensating a reduced depth of field in favor of a high spatial resolution of the imaging system 30. For this, the focal plane 31 of the imaging system 30 may be scanned through fourteen different axial positions, only ten of which are illustrated in FIG. 2 for reasons of clarity of the drawings. As a result, a plurality of different focal plane images is generated according to the total number of different axial positions z1, z2, z3, . . . chosen. FIG. 6, FIG. 7 and FIG. 8, exemplarily show a selection of three focal plane images 61, 62, 63 generated for three different axial positions z1, z2, z3 of the focal plane 31 of the imaging system 30.

Figure 9:
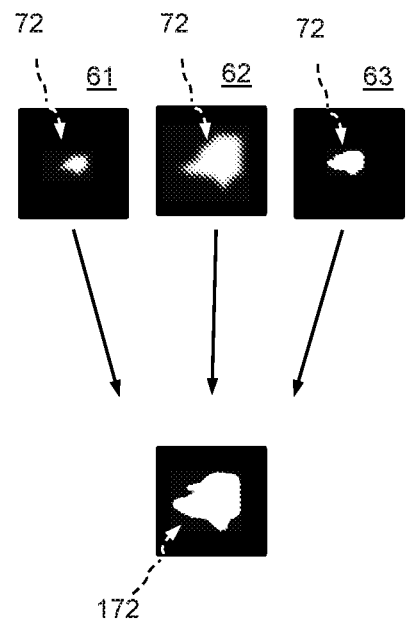
FIG. 9 schematically illustrates the step of generating a binary identification image with the aid of one specific image feature.

Next, the method according to the invention provides the step of identifying one or more image features in the plurality of different focal plane images 61, 62, 63, wherein each image feature 71, 72, 73, 74 might show a possible mold defect. As described above, identification of image features 71, 72, 73, 74 advantageously is accomplished by defining a pixel value threshold between background and non-background image data. Subsequently, a binary identification image is generated having the same size as the plurality of different focal plane images 61, 62, 63. The binary identification image is generated by setting a respective pixel of the binary identification image to a first value if a pixel value of a corresponding pixel of at least one of the focal plane images 61, 62, 63 is above the pixel value threshold, and to a second value if a pixel value of a corresponding pixel of all focal plane images 61, 62, 63 is below the pixel value threshold. After that, one or more possible pixel patterns are identified in the binary identification image which either consist of a singular pixel or a plurality of connected pixels set to the first value. FIG. 9 schematically illustrates the step of generating a binary identification image for that part of binary image containing the image feature 72 which is included in each of the focal plane images 61, 62, 63. As can be seen in FIG. 6-9, the image feature 72 has different shapes and sizes in the respective focal plane images 61, 62, 63, causing the corresponding pixel pattern 172 of the binary identification image to be larger than each individual image feature 72 in each individual focal plane image of the different focal plane images 61, 62, 63. Finally, for each part of the focal plane images 61, 62, 63 and each identified pixel pattern 172 of the binary identification image, it is determined whether one or more pixels of the individual focal plane images 61, 62, 63 that are within a respective image portion corresponding to a respective one of the identified pixel patterns 172 of the binary identification image have a pixel value that is above the pixel value threshold. The same procedure is performed for the other identified image features 71, 73, 74. The thus determined one or more pixels in the focal plane images 61, 62, 63 are then identified, that is, considered as an image feature 71, 72, 73, 74 showing a possible mold defect.

Next, for each identified image feature 71, 72, 73, 74, a respective sharpest focal plane image out of the plurality of different focal plane images 61, 62, 63 is identified. This is achieved by determining for which of the plurality of different focal plane images 61, 62, 63 a pre-defined sharpness measure of a respective image feature 71, 72, 73, 74 is at a maximum. Determination of the sharpness measure may be, for example, based on the Sobel operator. Preferably, the pre-defined sharpness measure of for each image feature 71, 72, 73, 74 is determined within a respective region of interest only (see dashed line circles in FIG. 6-8). The respective region of interest for each image feature 71, 72, 73, 74 is defined such that a respective image feature, e.g. 72, and its corresponding pixel pattern, e.g. 172, in the binary identification image is included in that region of interest, at least for each focal plane image 61, 62, 63 showing that specific image feature, e.g. 72. Advantageously, this reduces the computational resources and time needed for determining the sharpness measure. Referring again to the specific image feature 72, it can be seen from FIGS. 6-8 and FIG. 9, that the corresponding representative of the image feature 72 appears sharp in focal plane image 63, whereas it appears rather unsharp, in particular blurred or washed out, in focal plane images 61 and 62. In contrast, the corresponding image feature 74 appears sharpest in focal plane image 62, but appears unsharp in focal plane images 61 and 63.

The step of generating a focal plane image 61, 62, 63 may include applying a depth-of-field mask after averaging over the masked dark field images. The depth-of-field mask is configured such as to mask out non-sharp image regions showing mold portions which are outside a focal range of the imaging system 30 at the given axial position of the focal plane 31 associated to the respective focal plane image 61, 62, 63. The non-sharp image regions may be derived from the known geometry and shape of the mold as well as from the focal range and the focal length of the imaging system 30. In FIG. 6 the sharp and non-sharp image regions within the focal plane image 61 are indicated by the two dashed-and-dotted circles. The sharp image regions are located between both circles, the non-sharp image regions are located outside the outer dashed-and-dotted circle and inside the inner dashed-and-dotted circle. Advantageously, this additional step reduces the computational resources and time needed for the subsequent steps, that is, for identifying possible image features and determining the respective sharpest focal plane image.

After determining the respective sharpest focal plane image 61, 62, 63, a respective image section 81, 82, 83, 84 (see dashed line ovals in FIG. 6-8) out of the respective sharpest focal plane image 61, 62, 63 is determined for each identified image feature 71, 72, 73, 74 such that the identified image section 81, 82, 83, 84 includes the respective image feature 71, 72, 73, 74. As can be seen from FIG. 6-8, the image sections 81, 82, 83, 84 for the different identified image features 71, 72, 73, 74 do not overlap. Moreover, the image sections 81, 82, 83, 84 are smaller than the respective regions of interest for the respective identified image features 71, 72, 73, 74.

Figure 10:
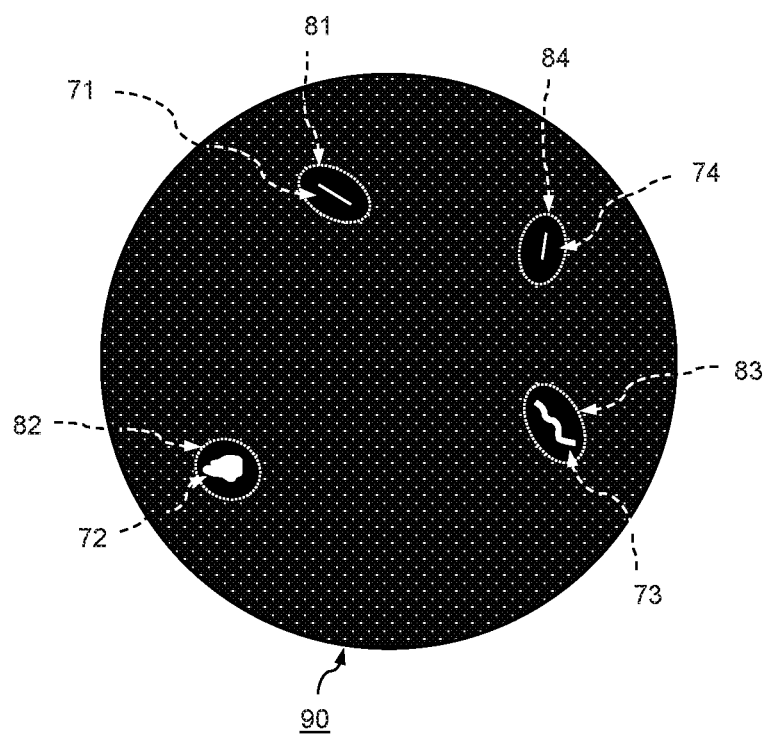
FIG. 10 shows an exemplary embodiment of a composed dark field image resulting from the method according to the invention.

Finally, as shown in FIG. 10, a composed dark field image 90 of the mold 10 is generated which includes the respective image sections 81, 82, 83, 84 for each identified image feature 71, 72, 73, 74. The other regions of the composed dark field image 90 are filled with a predefined background. Advantageously, the thus composed dark field image 90 enables determination as to whether the possible defects of the mold 10 still allow the mold 10 to be used for manufacturing ophthalmic lenses.

Embodiments of the invention have been described by way of example with the aid of the drawings. However, the invention is not limited to these embodiments, but rather many changes and modifications are possible without departing from the teaching of the instant invention. The scope of protection is therefore defined by the appended claims.

The invention claimed is:

1. A method for optically inspecting a mold (10) for manufacturing ophthalmic lenses for possible mold defects, the method comprising the steps of:
 a. taking an image (41) of the mold (10) along a center axis (Z) of the mold (10) that extends through an apex (15) of the mold and normal to a mold surface (16) at the apex (15) by illuminating the mold (10) with light (26) incident at an azimuthal illumination angle (φ1) and a polar illumination angle (Θ) with regard to the center axis (Z), and collecting and detecting light (28) reflected or scattered, respectively, from the mold (10) using an imaging system (30) arranged along and aligned with the center axis (Z), wherein a focal plane (31) of the imaging system (30) has an axial position (z1) along the center axis (Z) in the range of the mold (10);

b. repeating step a. for one or a plurality of different azimuthal illumination angles (φ2, φ3, φ4, φ5) around the center axis (Z) at the same polar illumination angle (Θ) and the same axial position (z1) of the focal plane (31) to generate a plurality of images (41, 42, 43, 44, 45) of the mold;

c. generating a masked dark field image (54) for each image of the plurality of images (41, 42, 43, 44, 45) taken at the different azimuthal illumination angles (φ1, φ2, φ3, φ4, φ5) at the same axial position (z1) of the focal plane (31) by applying a respective specular reflection mask (40) to each image of the plurality of images (41, 42, 43, 44, 45) of the mold such as to mask out image regions (44a, 44b) that include direct specular reflections (23, 24) from the mold (10), so as to obtain a plurality of masked dark field images;

d. generating a focal plane image (61) for the axial position (z1) of the focal plane (31) by averaging pixelwise over the masked dark field images (54) generated at the different azimuthal illumination angles (φ1, φ2, φ3, φ4, φ5) at the same axial position (z1) of the focal plane (31);

e. repeating steps a. to d. for one or a plurality of different axial positions (z2, z3) of the focal plane (31) to generate a plurality of different focal plane images (61, 62, 63);

f. identifying one or more image features (71, 72, 73, 74) in the plurality of different focal plane images (61, 62, 63), each image feature (71, 72, 73, 74) showing a possible mold defect;

g. determining for each identified image feature (71, 72, 73, 74) a respective sharpest focal plane image (61, 62, 63) of the plurality of different focal plane images (61, 62, 63) by determining for which focal plane image (61, 62, 63) of the plurality of different focal plane images (61, 62, 63) a pre-defined sharpness measure of the identified image feature (71, 72, 73, 74) is at a maximum;

h. generating for each identified image feature (71, 72, 73, 74) a respective image section (81, 82, 83, 84) out of the respective sharpest focal plane image (61, 62, 63), wherein the identified image section (81, 82, 83, 84) includes the identified image feature (71, 72, 73, 74);

i. generating a composed dark field image (90) of the mold (10) by composing the respective image sections (81, 82, 83, 84) for each identified image feature (71, 72, 73, 74) such as to enable determination as to whether the possible defects of the mold (10) allow the mold (10) to be used for manufacturing ophthalmic lenses.

2. The method according to claim 1, wherein the step of identifying one or more image features (71, 72, 73, 74) in the plurality of different focal plane images (61, 62, 63) includes defining a pixel value threshold between background and non-background image data;

generating a binary identification image of the same size as that of the plurality of different focal plane images (61, 62, 63) by setting a respective pixel of the binary identification image to a first value if a pixel value of a corresponding pixel of at least one of the focal plane images (61, 62, 63) is above the pixel value threshold, and by setting a respective pixel of the binary identification image to a second value if a pixel value of a corresponding pixel of all focal plane images (61, 62, 63) is below the pixel value threshold;

identifying in the binary identification image one or more pixel patterns consisting of a singular pixel or a plurality of connected pixels set to the first value;

determining for each focal plane image (61, 62, 63) and each identified pixel pattern of the binary identification image whether one or more pixels of the focal plane image (61, 62, 63) within a respective image portion corresponding to a respective one of the identified pixel patterns (172) of the binary identification image have a pixel value that is above the pixel value threshold, and identifying the possibly determined one or more pixels in the focal plane image (61, 62, 63) as an image feature (71, 72, 73, 74) showing a possible mold defect.

3. The method according to claim 1, wherein the step of identifying one or more image features (71, 72, 73, 74) further includes defining for each identified image feature (71, 72, 73, 74) a respective region of interest around the identified image feature (71, 72, 73, 74) such that the identified image feature (71, 72, 73, 74), in particular a corresponding pixel pattern (172) identified in the binary identification image, is included in the region of interest at least for each focal plane image (61, 62, 63) showing the identified image feature.

4. The method according to claim 2, wherein the step of identifying one or more image features (71, 72, 73, 74) further includes defining for each identified image feature (71, 72, 73, 74) a respective region of interest around the identified image feature (71, 72, 73, 74) such that the identified image feature (71, 72, 73, 74), in particular a corresponding pixel pattern (172) identified in the binary identification image, is included in the region of interest at least for each focal plane image (61, 62, 63) showing the identified image feature.

5. The method according to claim 3, wherein the pre-defined sharpness measure of each identified image feature (71, 72, 73, 74) is determined within the respective region of interest only.

6. The method according to claim 3, wherein for each identified image feature (71, 72, 73, 74) the respective image section (81, 82, 83, 84) of the respective sharpest focal plane image (61, 62, 63) corresponds to the respective region of interest.

7. The method according to claim 1, wherein the step of generating a focal plane image (61, 62, 63) includes applying a depth-of-field mask after averaging over the masked dark field images (54) such as to mask out non-sharp image regions showing mold portions which are outside a focal range of the imaging system (30) at the respective axial position (z1, z2, z3) of the focal plane (31).

8. The method according to claim 1, wherein step b. includes repeating step a. such as to take at least three images (41, 42, 43, 44, 45) of the mold (10) corresponding to at least three azimuthal illumination angles (φ1, φ2, φ3, φ4, φ5), which are angularly equidistantly distributed around the center axis (Z).

9. The method according to claim 1, wherein step b. includes repeating step a. such as to take at least ten images (41, 42, 43, 44, 45) of the mold (10) corresponding to at least ten azimuthal illumination angles ($\phi1$, $\phi2$, $\phi3$, $\phi4$, $\phi5$), which are angularly equidistantly distributed around the center axis (Z).

10. The method according to claim 1, wherein step e. includes repeating steps a. to d. such as to generate at least three focal plane images (61, 62, 63) corresponding to at least three axial positions (z1, z2, z3) of the focal plane (31) of the imaging system (30), which are equidistantly distributed along the center axis (Z).

11. The method according to claim 1, wherein step e. includes repeating steps a. to d. such as to generate at least ten focal plane images (61, 62, 63) corresponding to at least ten axial positions (z1, z2, z3) of the focal plane (31) of the imaging system (30), which are equidistantly distributed along the center axis (Z).

12. The method according to any claim 1, wherein the polar illumination angle ($\Theta$) is in the range of 1° to 89°.

13. The method according to claim 1, wherein the polar illumination angle ($\Theta$) is in the range of 15° to 45°.

14. The method according to claim 1, wherein the polar illumination angle ($\Theta$) is in the range of 15° to 25°.

15. The method according to claim 1, wherein the mold (10) is successively illuminated by a plurality of LEDs each configured and arranged for illuminating the mold (10) at a respective one of the different azimuthal illumination angles ($\phi1$, $\phi2$, $\phi3$, $\phi4$, $\phi5$).

16. The method according to claim 1, wherein the mold (10) is illuminated and imaged at a concave side of the mold in case the mold is a female mold, and wherein the mold is illuminated and imaged at a convex side (12) of the mold (10) in case the mold (10) is a male mold (10).

17. An apparatus (1) for optically inspecting a mold (10) for manufacturing ophthalmic lenses, in particular contact lenses, for possible mold defects, in particular for carrying out a method according to any one of the preceding claims, the apparatus comprising:

a mold holder (5) configured to hold the mold (10) in a pre-defined position such that a center axis (Z) of the mold (10) that extends through an apex (15) of the mold (10) and normal to a mold surface (16) at the apex (15) is aligned with a mounting axis (M) of the mold holder (5);

an illumination system (20) configured to illuminate the mold (10) with light (26) incident at a polar illumination angle ($\Theta$) and at different azimuthal illumination angles ($\phi1$, $\phi2$, $\phi3$, $\phi4$, $\phi5$) with regard to the mounting axis (M); and an imaging system (30) arranged along and aligned with the mounting axis (M) and configured to collect and detect light (28) reflected or scattered, respectively, from the mold (10), wherein the imaging system (30) is further configured to adjust a focal plane (31) of the imaging system (30) at different axial positions (z1, z2, z3) along the mounting axis (M) in the range of the mold (10) when being held by the mold holder (5).

18. The apparatus according to claim 17, further comprising a dome (100) covering the mold holder (5) and having an axis of symmetry (S) that extends through an apex (103) of the dome (100) and that is aligned with the mounting axis (M).

19. The apparatus according to claim 18, wherein the dome (100) comprises a plurality of illumination openings (101) circumferentially arranged around the axis of symmetry (S) at different azimuthal positions according to the polar illumination angle ($\Theta$) and the different azimuthal illumination angles ($\phi1$, $\phi2$, $\phi3$, $\phi4$, $\phi5$), with a light source being arranged in each illumination opening of the plurality of illumination openings (101).

20. The apparatus according to claim 17, wherein the dome (100) comprises a central imaging opening (102) at the apex (103) of the dome (100), with the imaging system being arranged in the central imaging opening (102).

* * * * *